Patented Mar. 31, 1953

2,633,458

UNITED STATES PATENT OFFICE 2,633,458

SULFUR-CONTAINING RESINOUS PRODUCTS FROM POLYEPOXIDES

Edward C. Shokal, Walnut Creek, Calif., assignor to Shell Development Company, Emeryville, Calif., a corporation of Delaware No Drawing. Application November 17, 1951,
Serial No. 256,965

18 Claims. (Cl. 260—45.2)

This invention relates to a new class of sulfur-containing resinous products. More particularly, the invention relates to novel sulfur-containing resinous products from polyepoxides, and to their utilization, particularly in the preparation of synthetic fibers and filaments.

Specifically, the invention provides new and particularly useful sulfur-containing resinous products prepared by reacting a polyepoxide, and preferably a low molecular weight glycidyl polyether of a polyhydric phenol, with hydrogen sulfide. The invention further provides valuable derivatives prepared from the aforedescribed sulfur-containing resinous products.

Polyepoxides, such as those obtained by reacting epichlorohydrin with dihydric alcohols or dihydric phenols, can be cured to form resins that are very hard and durable and have excellent electrical resistivity and inertness to chemicals. Products having such properties should be of value in the preparation of synthetic fabrics and textiles and attempts have been made in the past to convert the polyepoxide resins into filaments and fibers. Such attempts, however, have met with little success. In most cases, the polyepoxides have little if any fiber-forming properties and in those instances where the resins have been modified to form fibers, the resulting filaments have been found to have very poor strength and elasticity and are of little practical utility.

It is, therefore, an object of the invention to provide a new class of resinous materials from polyepoxides. It is a further object to provide polyepoxide resins that have fiber-forming properties. It is a further object to provide high molecular weight sulfur-modified polyepoxide resins that can be melt spun into fibers having good strength and elasticity. It is a further object to provide sulfur-containing polyepoxide resins that can be drawn into synthetic fibers having good durability and excellent dyeing characteristics. It is a further object to provide polyepoxide resins that can be drawn into fibers having good dielectric properties. It is a further object to provide sulfur-modified polyepoxide resins that may be further treated with monofunctional or polyfunctional agents to produce valuable derivatives. It is a further object to provide sulfur-modified polyepoxide resins that are valuable in the preparation of pottings and castings for electrical apparatus. It is a further object to provide sulfur-modified polyepoxide resins that are valuable in the preparation of improved surface coating and adhesive compositions. Other objects and advantages of the invention will be apparent from the following detailed description thereof.

It has now been discovered that these and other objects may be accomplished by the novel products of the invention comprising resinous materials obtained by reacting, preferably in the presence of an alkaline catalyst, a polyepoxide with hydrogen sulfide. The high molecular weight products prepared in this manner, and particularly those prepared from the glycidyl polyethers of the polyhydric phenols described hereinafter, have been found to have unexpected fiber-forming properties. Such products may be melt spun to form fibers that are pliable, strong and elastic and have excellent durability. These fibers may be tied into hard knots without materially decreasing their tenacity and they may be formed into threads or yarn which can be knitted or woven into very useful fabrics. The fibers formed from these high molecular weight products also have excellent dyeing characteristics. The resins prepared from the polyepoxides having at least three active epoxide groups, such as, for example, 1,2,3-tri(2,3-epoxypropoxy)propane, are particularly promising in this regard as the finished fibers possess active epoxide groups that can rapidly react with the conventional dyes, such as those of the basic type containing amino or substituted amino groups, to form dye fast materials.

It has been further discovered that the aforedescribed resinous products of the invention possess reactive hydroxyl groups and in many cases reactive mercapto and/or epoxide groups and they may be further reacted with monofunctional agents, such as the monocarboxylic acids, or polyfunctional cross-linking agents, such as diisocyanates, ureaformaldehyde resins, dialdehydes, polycarboxylic acids, and the like, to produce other new and particularly useful products. Many of these derivatives are particularly valuable in the preparation of pottings and castings for electrical apparatus, surface coating compositions, adhesive and impregnating compositions, and the like as described hereinafter.

The polyepoxides used in the preparation of the novel products of the invention comprise all those organic compounds containing at least two reactive epoxy

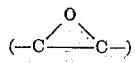

groups in their molecule. The polyepoxides may be saturated or unsaturated, aliphatic, cycloaliphatic, aromatic or heterocyclic and may be substituted if desired with non-interfering substituents. The polyepoxides may be monomeric or polymeric.

For clarity, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back titrated with 0.1 N sodium hydroxide to phenolphthalein end point. The epoxide value is calculated by considering one HCl as an equivalent of one epoxide. This method is used to obtain all epoxide values reported herein.

If the polyepoxides are single monomeric compounds having all of their epoxide groups intact, their epoxy equivalency will be whole integers, such as 2, 3, 4, and 5. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

The monomeric-type polyepoxide compounds may be exemplified by the following: vinyl cyclohexene dioxide, epoxidized soyabean oil, butadiene dioxide, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-hydroxy-3,4-epoxybutoxy)diphenyldimethylmethane, 1,3-bis(4,5-epoxypentoxy) - 5 - chlorobenzene, 1,4 - bis(3,4 - epoxybutoxy)-2-chlorocyclohexane, diglycidyl ether, 1-3-bis(2-hydroxy-3,4-epoxybutoxy)benzene, 1,4-bis-(2-hydroxy-4,5-epoxypentoxy)benzene, 1,2,5,6-di-epoxy-3-hexyne, 1,2,5,6-diepoxyhexane, and 1,2,3,4 - tetra(2 - hydroxy - 3,4-epoxybutoxy)butane.

Other examples of this type include the glycidyl polyethers of the polyhydric phenols obtained by reacting a polyhydric phenol with a great excess, e. g., 4 to 8 mol excess, of a halogen-containing epoxide in an alkaline medium. Thus, polyether A described hereinafter, which is substantially 2,2-bis(2,3-epoxypropoxyphenyl)propane is obtained by reacting bis-phenol (2,2-bis(4-hydroxyphenyl)propane) with an excess of epichlorohydrin as indicated below. Other polyhydric phenols that can be used for this purpose include resorcinol, catechol, hydroquinone, methyl resorcinol, or polynuclear phenols, such as 2,2 - bis(4 - hydroxyphenyl)butane, 4,4' - dihydroxybenzophenone, bis(4 - hydroxyphenyl) ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)-ether, the reaction product of sorbitol and bis-(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A further group of the polymeric polyepoxides comprises the hydroxy-substituted polyepoxy polyethers obtained by reacting, preferably in an alkaline medium, a slight excess, e. g., .5 to 3 mol excess, of a halogen-containing epoxide as described above, with any of the aforedescribed polyhydric phenols, such as resorcinol, catechol, bis-phenol, bis(2,2' - dihydroxy - dinaphthyl) methane, and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3 - epoxypropyl ether), poly(2,3 - epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxystyrene).

Particularly preferred group of epoxy-containing organic materials to be employed in the process of the invention are the members of the group consisting of the organic compounds possessing a plurality of epoxyalkoxy radicals, e. g., 2 to 4, joined to an organic radical which contains from one to two aromatic rings, organic compounds possessing a plurality of epoxyhydroxyalkoxy radicals, e. g., 2 to 4, joined to an organic radical containing from one to two aromatic rings, the polyepoxy-containing polymeric reaction product of an aromatic polyhydric phenol and epihalohydrin, the polyepoxy-containing polymeric reaction product of an aliphatic polyhydric alcohol and epichlorohydrin, the polyepoxy-containing polymeric reaction product of a polyhydric phenol and a polyepoxide compound, the polyepoxy-containing polymeric reaction product of an aliphatic polyhydric alcohol and a polyepoxide compound, the polymers of the epoxy-containing monomers possessing at least one polymerizable ethylenic linkage prepared in the absence of alkaline or acidic catalysts, and copolymers of the foregoing epoxy-containing monomers and a monomer containing at least one $CH_2=C=$ group prepared in the absence of alkaline or acidic catalysts. The expression "epoxy-alkoxy" radical refers to an alkoxy radical substituted with an epoxy group. The expression "epoxyhydroxy-alkoxy radical" refers to an alkoxy radical substituted with a hydroxyl and epoxy group.

Coming under special consideration, particularly because of the fine quality of the synthetic fibers prepared from their resinous products with hydrogen sulfide are the monomeric and polymeric-type glycidyl polyethers of dihydric phenols obtained by reacting epichlorohydrin with a dihydric phenol in an alkaline medium. The monomeric products of this type may be represented by the general formula

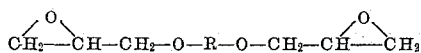

wherein R represents a divalent hydrocarbon radical of the dihydric phenol. The polymeric products will generally not be a single simple molecule but will be a complex mixture of glycidyl polyethers of the general formula

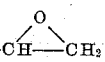

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyether will be illustrated below. Unless otherwise specified, parts indicated are parts by weight.

PREPARATION OF GLYCIDYL POLYETHERS OF DIHYDRIC PHENOLS

Polyether A

About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as Polyether A.

Polyether B

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40 so the epoxy equivalency was 1.9. For convenience, this product will be referred to as Polyether B.

Polyether C

About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at a temperature of 130° C. The Durrans' Mercury Method melting point of the resulting product is 52° C. and the molecular weight is about 710. The product has an epoxy value of 0.27 eq./100 g. so the epoxy equivalency is 1.9.

Polyether D

By using a smaller ratio of epichlorohydrin to bis-phenol, a glycidyl polyether of higher melting point was obtained. Thus, Polyether D was obtained in the same manner as Polyether C except that for every mol of bis-phenol, there was used 1.57 mols of epichlorohydrin and 1.88 mols of sodium hydroxide. This provided a product having a melting point of about 70° C., a molecular weight of 900, and an epoxide value of 0.20 eq./100 g.

Polyether E

This glycidyl polyether of still higher melting point was prepared in like manner to that of Polyether B except that for each mol of bis-phenol there was employed 1.22 mols of epichlorohydrin and 1.37 mols of sodium hydroxide. The resulting product had a melting point of 98° C., a molecular weight of 1400 and an epoxide value of 0.103 eq./100 g.

Glycidyl polyethers of higher molecular weight and softening point are best prepared by reacting a lower polyether with less than an equimolecular amount of dihydric phenol. Thus upon heating the above-noted product which has a softening point of 98° C. to a temperature of about 150° C. and then adding 5% by weight of bis-phenol after which the temperature is gradually increased to 190° C. in about 30 minutes followed by maintaining the temperature at this point for an additional 1½ hours, there is obtained a glycidyl polyether having a softening point of 131° C., an epoxy value of 0.05 equivalents of epoxy per 100 grams and a molecular weight of 2900.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 900. Particularly preferred are those having a Durrans' Mercury Method softening point no greater than 60° C.

Also of special interest are the polyglycidyl polyethers of polyhydric alcohols obtained by reacting the polyhydric alcohol with epichlorohydrin, preferably in the presence of 0.1% to 5% of an acid-acting compound, such as boron trifluoride, hydrofluoric acid or stannic chloride. This reaction is effected at about 50° C. to 125° C. with the proportions of reactants being such that there is about one mol of epichlorohydrin for every equivalent of hydroxyl group in the polyhydric alcohol. The resulting chlorohydrin ether is then preferably dehydrochlorinated by heating at about 50° C. to 125° C. with a small, e. g., 10% stoichiometrical excess of a base, such as sodium aluminate.

The preparation of the polyglycidyl ethers of polyhydric alcohols may be illustrated below.

PREPARATION OF GLYCIDYL POLYETHERS OF POLYHYDRIC ALCOHOLS

*Polyether F*

About 276 parts (3 mols) of glycerol was mixed with 832 parts (9 mols) of epichlorohydrin. To this reaction mixture was added 10 parts of diethyl ether solution containing about 4.5% boron trifluoride. The temperature rose as a result of the exothermic reaction and external cooling with ice water was applied to keep the temperature between about 50° C. and 75° C. during a reaction period of about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.671 equivalents per 100 grams and the molecular weight was 324 as measured ebullioscopically in dioxane solution. The epoxy equivalency of this product was, therefore, about 2.13. For convenience, this product will be referred to hereinafter as Polyether F.

Particularly preferred members of this group comprise the glycidyl polyethers of the aliphatic polyhydric alcohols containing from 2 to 10 carbon atoms, and more preferably the alkanediols and alkanetriols containing from 2 to 8 carbon atoms. Such products preferably having an epoxy equivalency between 1.0 and 2.5 and a molecular weight between 300 and 1000.

Coming under special consideration, particularly because of the fine dyeing characteristics of the fibers prepared from their hydrogen sulfide reaction products, are the polyepoxides possessing at least three epoxide groups, such as 1,2,3-tri(2,3-epoxypropoxy)propane, 1,2,4-tri(2,3-epoxypropoxy)benzene, 1,2,3,4-tetra(3,4-epoxybutoxy)butane, poly(allyl glycidyl ether), 1,3,5-tri(2,3-epoxypropoxy)octane, and 1,3,4-tri(3,4-epoxybutoxy)cyclohexane.

The proportions in which the polyepoxides and hydrogen sulfide are combined may vary over a wide range depending upon the properties desired in the finished product. If high molecular weight polymeric materials having superior fiber-forming properties are desired, the polyepoxide should be maintained in excess or in an amount which is at least chemically equivalent to the hydrogen sulfide. The expression "chemically equivalent" as used herein in reference to the polyepoxide and hydrogen sulfide refers to the amount required to furnish one epoxide group for every reactive mercapto hydrogen atom. In producing the high molecular weight polymers, the polyepoxide and hydrogen sulfide are preferably combined in equivalent ratios varying from 5:1 to 1:1, and more preferably from 3:1 to 1.5:1. Approximately chemical equivalent amounts of polyepoxide and hydrogen sulfide are the most ideal proportions to be used for preparing the high molecular weight products. If the hydrogen sulfide is maintained in excess, the products will be of lower molecular weight and will generally fail to have the desired fiber-forming properties. Such products, however, will possess active mercapto groups and may be further reacted with various components as described hereinafter to produce higher molecular weight products which do possess the desired fiber-forming properties. In the preparation of the lower molecular weight products, the polyepoxide and hydrogen sulfide are preferably combined in equivalent ratios varying from 1:20 to 1:4, and more preferably from 1:10 to 1:5.

In preparing the high molecular weight products of the invention, it is generally desirable to add the hydrogen sulfide in small increments over a period of time so that there will be ample opportunity for the formation of the long symmetrically arranged macromolecules. In conducting the process in this manner, it is usually preferred to bubble the hydrogen sulfide through the reaction mixture for a short period and then allow the mixture to stand until the hydrogen sulfide odor has substantially disappeared and then another portion of hydrogen sulfide is added. If lower molecular weight products are desired, the hydrogen sulfide may be added all at one time under pressure to the reaction vessel containing the polyepoxide, or alternatively, the polyepoxide may be injected into a vessel containing the required amount of hydrogen sulfide.

The reaction between the polyepoxide and hydrogen sulfide is preferably accomplished in the presence of an alkaline catalyst, such as sodium hydrosulfide, sodium ethoxide, sodium phenoxide, sodium and potassium hydroxide, potassium phenoxide, the amino compounds, such as triethylamine, ethylene diamine, diethyl amine, diethylene triamine, pyridine, piperidine, dicyandiamide, melamine, and the like. The amount of the catalyst utilized will vary depending upon the type of reactants and catalyst selected but in most cases will vary from about 0.001% to 5% by weight. Preferred amounts of catalyst range from .01% to 1.0% by weight.

The temperature employed in the reaction may vary over a very wide range. In some instances, the reaction between the polyepoxide and hydrogen sulfide in the presence of the aforedescribed catalysts proceeds at a satisfactory rate at temperatures as low as −15° C. to room temperature, while in other cases a satisfactory rate can be accomplished only by using higher temperatures, such as 40° C. to 150° C. Preferred temperatures range from 20° C. to about 100° C. In some instances, such as where an excess of hydrogen sulfide is to be employed, it may be desirable to conduct the reaction at the lower temperatures, such as from −10° C. to 0° C. so as to increase the solubility of the hydrogen sulfide in the reaction mixture.

The reaction may be conducted in the presence or absence of solvents or diluents. The solvents if employed may be a solvent for the reactants and the resinous product or a solvent for the reactants and a non-solvent for the resinous product. Suitable solvents include toluene, benzene, dioxane, ethyl alcohol, tetrahydrofuran, dibutyl ether, and the like and mixtures thereof. It has been found that mixtures of alcohols and ethers, such as a mixture of diethyl ether and ethyl alcohol, are particularly preferred solvents for this type of reaction.

Monofunctional components, such as monoepoxides and monomercaptans, may also be added to the reaction mixture to give modified products or to products having lower molecular weights. Such components may be exemplified by epichlorohydrin, 2,3-epoxypropoxybenzene, 2,3-epoxypropoxypentane, ethyl mercaptan, benzyl mercaptan, and the like. Such components are preferably added in minor quantities, such as from 0.1% to 10% by weight of the total reactants, depending upon the molecular weight type of product desired.

In some cases, it may be desirable to conduct the reaction in the absence of oxygen, i. e., in an inert atmosphere, such as in an atmosphere of nitrogen. This is particularly true in case the desired product is to possess active mercapto groups as it has been found that the presence of oxygen and peroxides accelerate the condensation of the mercapto groups into bisulfide linkages.

The reaction may be conducted at atmospheric, superatmospheric or subatmospheric pressures. In the preparation of the high molecular polymers, it is generally preferred to conduct the process at atmospheric pressure.

At the completion of the reaction, the resinous products may be recovered by a variety of methods obvious to those skilled in the art, such as solvent extraction, filtration, precipitation, distillation, and the like.

As indicated above, the high molecular weight resinous products of the present invention, e. g., those having a molecular weight of at least 5,000 and preferably between 5,000 and 50,000, can be spun into fibers having excellent physical properties. The spinning of these materials may be carried out by a variety of methods known to the workers in the art. For example, the polymer may be melted and then touched with a rod to draw away a filament. This filament may then be caught on a moving drum or reel and a continuous filament drawn from the molten mass until the latter is exhausted. The cross-section of the filament thus obtained can be regulated by controlling the temperature of the molten mass and the rate of reeling. The higher the temperature and the more rapid the reeling, the finer will be the filament.

Continuous filaments may also be produced by extruding the molten resinous product through an orifice and continuously collecting the extruded filament on rotating drums. The fineness of the filaments may be controlled by controlling the temperature of the molten polymer, the amount of pressure applied, the size of the orifice and the rate of reeling.

The properties of the high molecular weight products of the invention make it possible to obtain fine filaments as fine as 0.1 mm. or less. The fibers are characterized by being very pliable, strong and elastic and having good dielectric properties, durability and dyeing characteristics. Fabrics prepared from these fibers are particularly suited for use in the preparation of electrical laminates, electrical insulations, and the like.

The resinous products of the present invention prepared in the presence of an excess of the hydrogen sulfide generally fail to possess the desired fiber-forming properties due to their low molecular weight. Such products, however, possess active mercapto groups and may be further treated to build up higher molecular weight molecules having the desired fiber-forming properties. Thus, these products may be subsequently treated with any of the aforedescribed polyepoxides, such as the special group of glycidyl polyethers of the polyhydric phenols, or they may be polymerized by the addition of metal oxides, such as lead dioxide, known to combine polythiol molecules through the formation of di-sulfide linkages. The high molecular weight products obtained in this manner have the same superior film-forming properties shown for the above-described high molecular weight products prepared in the excess of the polyepoxide.

In addition, to their fiber-forming properties, the resinous products of the invention possess other unobvious properties that enable them to be used for a great variety of other important industrial applications. They find use, for example, as compound agents for synthetic and natural rubber, as vulcanizing accelerators, waterproofing agents for inorganic gel greases, extreme pressure additives for lubricating oils, jet-fuels, plasticizers, and the like.

The resinous products of the invention may also be further reacted through the hydroxyl groups formed by the reaction of the hydrogen sulfide with the epoxide groups, and/or through the active epoxide or mercapto groups with various reactants to produce valuable derivatives. They may be reacted, for example, with monocarboxylic acids, such as acetic acid, butyric, caproic, capric, 2-ethylhexanoic, lauric, stearic, benzoic, cyclohexanoic, isopropylbenzoic and tert-butylbenzoic acid to produce ester derivatives having modified fiber-forming properties. The fibers formed from these derivatives generally have better water resistance than those prepared from the resinous products themselves.

The resinous products may also be further reacted with polyethylenic monocarboxylic acids to produce products having value in the preparation of coating compositions, such as varnishes and the like. Examples of such acids are the rosin acids, as abietic acid, pimaric acid, acids derived from linseed, soyabean, perilla, oiticica, tung, walnut, and dehydrated castor oil, as well as the lower fatty acids, such as pentadienoic, hexadienoic, and decadienoic acids.

The resinous products of the invention may also be reacted with other reagents which act to cross-link the molecules through the hydroxyl groups and/or through the active epoxide or mercapto groups. Among these materials are components, such as diisocyanates, e. g., methylene bis(4-phenyl) isocyanate, dialdehydes, e. g., glyoxal, polycarboxylic acids, such as phthalic acid, succinic acid, adipic acid, malonic acid, maleic acid, metal oxides, such as lead dioxide, the peroxides, such as tert-butyl peroxide, amines, such as triethylamine, ethylene diamine, diethylene triamine, and various resinous products, such as the amine-aldehyde or amide-aldehyde type resins, as those prepared from formaldehyde and amide or amines as urea, thiourea, hydroxy urea, acetyl urea, phenyl thiourea, and the like, and mixtures thereof. The amount of these agents employed will depend upon the type of resinous product and the agent selected, but in most cases, the desired hard, infusible product may be obtained by using the agents in amounts varying from .1% to 40% by weight, and more preferably from .1% to 10% by weight.

The cured resinous products are of particular value in the preparation of potting and casting applications for electrical apparatus where the resulting products must be quite hard and durable but still highly flexible and distensible. In the preparation of castings and pottings from these materials, it is generally the practice to combine the resinous product with the curing agent, such as the lead dioxide, and then pour this mixture into the mold or casting containing the electrical apparatus and then allow the mixture to stand. After a short period the mixture sets up into the desired hard rubber-like resin. Heat may also be applied to hasten the cure.

The cured resinous products are also of value in the preparation of hard infusible coating compositions. In this application, the resinous products are generally combined with the curing agents, such as the diisocyanates, urea-formaldehyde resins, dialdehydes or the polycarboxylic acids, in a common solvent or diluent and then the resulting mixture spread on the surface and allowed to stand in air or exposed to relatively high baking temperatures. The films prepared in this manner are very hard and tough but still highly flexible and distensible.

The resinous products may also be combined with other film-forming materials to produce a great variety of surface coating compositions. Film-forming materials that can be used for this purpose include the drying oils, such as tung oil, linseed oil, dehydrated castor oil, soyabean oil, and the like, cellulose derivatives, such as cellulose nitrate, cellulose acetate, cellulose acetate butyrate, cellulose propionate, ethyl cellulose, methyl cellulose, butyl cellulose, cellulose aceto-propionate, and the like, and the vinyl polymers, such as polymers of vinyl chloride, vinylidene chloride, methyl methacrylate, ethyl acrylate, vinyl benzoate, diallyl phthalate, and the like, and mixtures thereof. Coating compositions of this type are generally prepared by merely mixing the film-forming material and the desired resinous products with a common solvent, such as cyclohexanone, benzene, toluene and the like, which may contain other ingredients, such as plasticizers, pigments, and driers. These compositions may then be spread on the desired surface and air-dried or baked at relatively high temperatures.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

EXAMPLE I

About 552 parts of a glycidyl polyester of bisphenol having a molecular weight of about 350 and an epoxy equivalency of 1.75 (Polyether A disclosed above) was combined with 720 parts of toluene and 1 part of sodium methoxide and hydrogen sulfide bubbled into the resulting mixture at room temperature for about a half hour. The addition of hydrogen sulfide was then discontinued and the mixture allowed to stand until the odor of hydrogen sulfide in the mixture had substantially disappeared. Other portions of hydrogen sulfide were then added in this manner until about 26 parts had been added. At that time the reaction mixture had formed into two layers. The lower layer, which was a viscous liquid, was removed and extracted three times with boiling toluene. The residue was then boiled in water and subsequently allowed to solidify at room temperature. The resulting product was a hard solid resin having a softening point by Durrans' Mercury Method of 130° C. Analysis: Percent carbon 67.53, percent H, 7.04, percent S 7.6, epoxy equivalents/100 gm. .004, SH value less than .01.

A portion of the resin produced above when melted at 150–180° C. could be drawn out into fine fibers that were strong and elastic and had excellent durability. The fibers of .1 to .5 mm. could be tied into hard knots without breaking. Filaments of .05 mm. had an elongation of about 17% and a tensile strength of over 31,000 p. s. i.

Fibers having similar properties could be obtained by substituting equivalent portions of Polyethers B, C and D for Polyether A in the above-described process.

EXAMPLE II

About 3 parts of the hydrogen sulfide-Polyether A polymer produced in Example I was combined with 50 parts of acetic anhydride and the resulting mixture refluxed for 6 hours. The residue was then recovered and washed several times with hot water and then boiled to remove the last trace of acid and anhydride. The resulting product was a hard solid resin having a relatively high melting point. A portion of this resin when heated to 200° C. could be drawn out into fine fibers which were very pliable and strong and could be tied into knots without breaking.

Fibers having similar properties could be obtained by substituting equivalent portions of each of the following acids for the acetic anhydride in the above-described process: butyric acid, caproic acid, 2-ethylhexoic acid, and capric acid.

EXAMPLE III

About 146 parts of bis(2,3-epoxypropyl) sulfide was combined with 300 parts of toluene and 1 part of sodium methoxide and hydrogen sulfide bubbled into the resulting mixture at room temperature to saturate the solution. The addition of hydrogen sulfide was discontinued and the mixture allowed to stand until the odor of hydrogen sulfide had disappeared. Other portions of hydrogen sulfide were then added in this manner until about 20 parts of hydrogen sulfide had been added. At this time the mixture had formed into two layers. The lower layer, which was a viscous liquid was then removed and extracted with boiling toluene. The residue was then boiled in water and subsequently allowed to solidify at room temperature. The resulting product was a soft solid which was soluble in dioxane and tetrahydrofuran. When melted, a portion of this resin could be drawn into fine fibers that could be tied into hard knots without breaking.

EXAMPLE IV

About 300 parts of Polyether A and 100 parts of poly(allyl glycidyl ether) were combined with 650 parts of toluene and 1 part of sodium hydrosulfide and hydrogen sulfide bubbled into the resulting mixture at room temperature for about a half hour. The addition of hydrogen sulfide was discontinued and the mixture allowed to stand until the odor of hydrogen sulfide had disappeared. Other portions of hydrogen sulfide were then added in this manner until about 26 parts of hydrogen sulfide had been added. At this time, the reaction mixture had formed into two layers. The lower layer was removed and extracted three times with boiling toluene. The resulting product was a hard solid resin. When melted, a portion of the resin could be drawn into fine fibers that could be tied into hard knots without breaking.

EXAMPLE V

About 1 part of sodium hydrosulfide was added to 130 parts of diglycidyl ether and hydrogen sulfide bubbled into the resulting mixture at room temperature to saturate the solution. The addition of hydrogen sulfide was then discontinued and the mixture allowed to stand until the odor of hydrogen sulfide had disappeared. Other portions were added in this manner until about 20 parts of hydrogen sulfide had been added. At the end of this period, the mixture had formed into a soft solid that was partially soluble in tetrahydrofuran, acetonitrile and ethanol. This solid, when melted, could be drawn into fine fibers.

EXAMPLE VI

A coating composition was prepared by adding the hydrogen sulfide-Polyether A polymer produced in Example I to cyclohexanone to form a 20% solution and then mixing this with an equal quantity of a 25% solution of RS-½ sec. nitrocellulose in n-butyl acetate. When applied to steel panels, this mixture dried in air to form a very hard, durable coating.

EXAMPLE VII

A coating composition was also prepared by adding the hydrogen sulfide-Polyether A polymer produced in Example I to cyclohexanone to form a 20% solution and then mixing this with an equal quantity of a 20% solution of a vinyl chloride-vinyl acetate copolymer in cyclohexanone. When applied to steel panels, this mixture dried in air to form a very hard, water-resistant coating.

EXAMPLE VIII

About 10 parts of the hydrogen sulfide-Polyether A polymer produced in Example I was dissolved in 20 parts of cyclohexanone and this mixture was combined with 2 parts of methylene bis(4-phenyl) isocyanate. When all of the diisocyanate was in solution, the mixture was spread on glass and metal panels. Films baked for ½ hour at 200° C. were very hard and flexible and could be bent without cracking. The films were also resistant to solvents, such as methyl ethyl ketone, and to water.

EXAMPLE IX

A potting composition was prepared by mixing 40 parts of the hydrogen sulfide-Polyether A polymer produced in Example I with 8 parts of lead dioxide and the resulting mixture placed in a mold containing coiled copper wires and the mold placed in a forced draft at 100° C. In a short period, the mixture had set to a hard, rubber-like product.

EXAMPLE X

About 5.8 parts of the hydrogen sulfide-Polyether A polymer was dissolved in warm cyclohexanone and mixed with 1 part of phthalic anhydride and the mixture heated for 1 hour at 180° C. The resulting product was a rubbery gel. When transferred to a mold and cured at 10 minutes at 10,000 p. s. i. at 145° C., a clear hard disk was obtained.

EXAMPLE XI

A coating composition was prepared by mixing 40 parts of the hydrogen sulfide-Polyether A polymer produced in Example I with 40 parts of a urea-formaldehyde resin (Beetle 227-8) in a solvent comprising 45% xylene and 55% cyclohexanone and 5% butanol. This mixture was then cast on tin panels and dried for several hours at 110° C. At the end of this period, the films were very hard and tough and had good adhesion to the metal surface.

EXAMPLE XII

A low molecular weight sulfur-containing product was prepared from Polyether A in the following manner. About 200 parts of Polyether A was dissolved in 300 parts of toluene and this mixture was placed in a stainless steel vessel equipped with a water-jacket reflux condenser. Hydrogen sulfide was then bubbled through the solution to displace the air. The outlet valve was then closed and $H_2S$ pressure was applied. A pressure of about 50 p. s. i. g. was reached and then the system was closed. At the conclusion of the reaction, the mixture was found to contain a resinous precipitate. This precipitate was extracted with hot toluene and when dried in a heated force draft at 180° C. was a very viscous liquid.

About 19 parts of the resin produced above was then combined with 15 parts of Polyether A and the resulting mixture allowed to stand at room temperature. In a short period, the mixture had set up into a hard solid. When melted, this solid could be drawn out into fine fibers which were very pliable and strong.

EXAMPLE XIII

About 500 parts of a glycidyl polyether of glycerol having a molecular weight of about 324 and an epoxy equivalency of 2.13 (Polyether F produced above) is combined with 600 parts of toluene and 1 part of sodium methoxide and hydrogen sulfide bubbled into the resulting mixture at room temperature for about a half hour. The addition of hydrogen sulfide is then discontinued and the mixture allowed to stand until the odor of hydrogen sulfide has disappeared. Other portions of hydrogen sulfide are then added in this manner until about 25 parts have been added. The viscous liquid formed by this reaction is then extracted with toluene and allowed to set at room temperature.

40 parts of the hydrogen sulfide-Polyether F polymer produced above is then combined with 8 parts of lead dioxide and the resulting mixture placed in a mold containing coiled copper wires and the mold placed in a forced draft at 100° C. In a short period, the mixture has set to a hard, rubber-like product.

I claim as my invention:

1. A sulfur-containing resinous product obtained by reacting a polyepoxide with hydrogen sulfide.

2. A hard, infusible product obtained by treating the resinous product defined in claim 1 with a cross-linking agent.

3. A sulfur-containing resinous product obtained by reacting a polyepoxide having an epoxy equivalency of at least 1.0 with hydrogen sulfide in the presence of an alkaline catalyst.

4. A high molecular weight sulfur-containing resinous product obtained by reacting a glycidyl polyether of a polyhydric phenol having an epoxy equivalency greater than 1.0 with up to an equivalent amount of hydrogen sulfide in the presence of an alkaline catalyst.

5. A hard, infusible product obtained by treating the resinous product defined in claim 4 with a cross-linking agent of the group consisting of diisocyanates, dialdehydes, polycarboxylic acids, and urea-formaldehyde resins.

6. A high molecular weight sulfur-containing resinous product capable of being melt spun into fiber which is obtained by reacting a glycidyl polyether of a dihydric phenol having an epoxy equivalency between 1.0 and 2.5 and a molecular weight between 300 and 1000 with hydrogen sulfide in an equivalent ratio varying from 4:1 to 1:1 in the presence of an alkaline catalyst.

7. A sulfur-containing resinous product obtained by reacting a glycidyl polyether of a polyhydric alcohol having an epoxy equivalency between 1.0 and 2.5 with hydrogen sulfide in an equivalent ratio varying from 4:1 to 1:1 in the presence of an alkaline catalyst.

8. A sulfur-containing resinous product obtained by reacting a glycidyl polyether of 2,2-bis(4-hydroxyphenyl)propane having an epoxy equivalency greater than 1.0 and a molecular weight between 300 and 500 with hydrogen sulfide in an equivalent ratio varying between 2:1 and 1:1 in the presence of an alkaline catalyst at a temperature between 0° C. and 100° C.

9. A sulfur-containing resinous product obtained by reacting a mixture of a glycidyl polyether of 2,2-bis(4-hydroxyphenyl)propane having an epoxy equivalency greater than 1.0 and poly(allyl glycidyl ether) with hydrogen sulfide in an equivalent ratio varying between 2:1 and 1:1 in the presence of sodium hydrosulfide at a temperature between 0° C. and 100° C.

10. A sulfur-containing resinous product obtained by reacting bis(2,3-epoxypropyl)sulfide with hydrogen sulfide in an equivalent ratio varying between 2:1 and 1:1 in the presence of sodium hydrosulfide.

11. A sulfur-containing resinous product obtained by reacting diglycidyl ether with hydrogen sulfide in an equivalent ratio varying between 2:1 and 1:1 in the presence of an alkaline catalyst.

12. A sulfur-containing resinous product obtained by reacting a glycidyl polyether of 2,2-bis(4-hydroxyphenyl)propane having an epoxy equivalency between 1.0 and 2.5 and a molecular weight between 300 and 500 with an excess of hydrogen sulfide in the presence of sodium hydrosulfide.

13. A hard, infusible product obtained by reacting the resinous product defined in claim 10 with a diisocyanate.

14. A hard, infusible product obtained by reacting the resinous product defined in claim 10 with an urea-formaldehyde resin.

15. A hard, infusible product obtained by reacting the resinous product defined in claim 11 with phthalic anhydride.

16. A process comprising reacting a polyepoxide with hydrogen sulfide in the presence of an alkaline catalyst.

17. A process comprising reacting a glycidyl polyether of a polyhydric phenol having an epoxy equivalency greater than 1.0 with up to an equivalent amount of hydrogen sulfide in the presence of an alkaline catalyst.

18. A process for forming resinous products capable of being melt spun into strong, pliable fibers comprising reacting a glycidyl polyether of 2,2-bis(4-hydroxyphenyl)propane having an epoxy equivalency between 1.0 and 2.5 and a molecular weight between 300 and 500 with hydrogen sulfide in an equivalent ratio of 3:1 to 1:1 in the presence of sodium hydrosulfide.

EDWARD C. SHOKAL.

REFERENCES CITED

The following references are of record in the file of this patent:

FOREIGN PATENTS

| Number | Country | Date |
|---|---|---|
| 251,647 | Switzerland | Sept. 1, 1948 |